No. 844,601. PATENTED FEB. 19, 1907.
P. KOERPER.
FRUIT PICKER.
APPLICATION FILED JUNE 28, 1906.

Witnesses
L. B. James
C. W. Griesbauer

Inventor
Philip Koerper
by H. B. Willson & Co.
Attorneys

UNITED STATES PATENT OFFICE.

PHILIP KOERPER, OF PIKEVILLE, KENTUCKY.

FRUIT-PICKER.

No. 844,601.  Specification of Letters Patent.  Patented Feb. 19, 1907.

Application filed June 28, 1906. Serial No. 323,813.

*To all whom it may concern:*

Be it known that I, PHILIP KOERPER, a citizen of the United States, residing at Pikeville, in the county of Pike and State of Kentucky, have invented certain new and useful Improvements in Fruit-Pickers; and I do declare the following to be a full, clear, and exact description of the invention, such as will enable others skilled in the art to which it appertains to make and use the same.

This invention relates to improvements in fruit-pickers.

The object of the invention is to provide a fruit-picker by means of which all kinds of fruit may be severed or picked from the branches without bruising or breaking the fruit.

With the above and other objects in view the invention consists of certain novel features of construction, combination, and arrangement of parts, as will be hereinafter described and claimed.

Figures 1, 2:
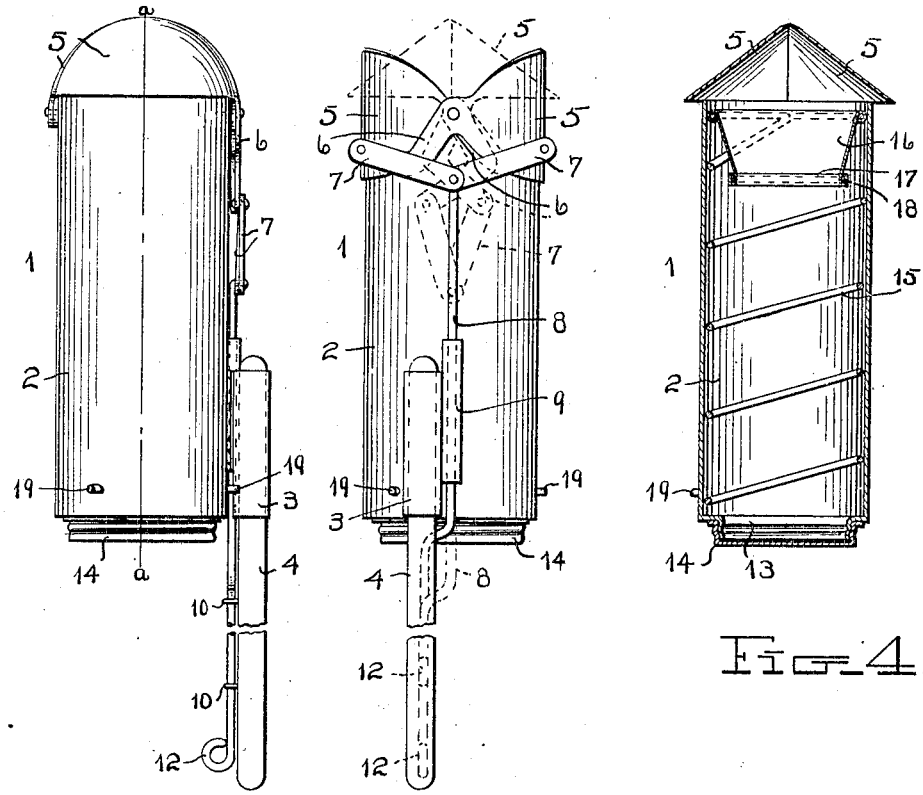
Figure 3:
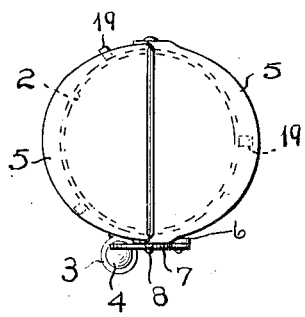
Figure 5:
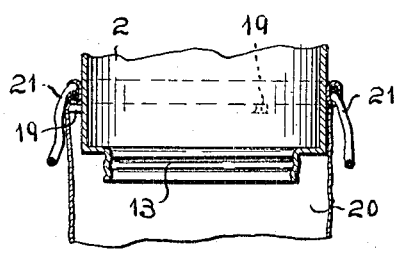

In the accompanying drawings, Figure 1 is a side view of a fruit-picker constructed in accordance with the invention. Fig. 2 is a similar view taken at right angles to Fig. 1, showing the severing-blades open in full lines and closed in dotted lines. Fig. 3 is a top plan view. Fig. 4 is a vertical sectional view on the line *a a* of Fig. 1; and Fig. 5 is a similar view of the lower end of the picker-cylinder, showing a modified arrangement of the same.

Referring more particularly to the drawings, 1 denotes the picker, which consists of a tubular body portion 2, which is preferably cylindrical in cross-section. To one side of the cylindrical body portion 2 is secured a socket 3, with which is adapted to be engaged the upper end of a pole or handle 4. Said handle is preferably jointed to provide for the lengthening or shortening of the same, as may be found necessary.

Pivotally connected to the upper end of the cylindrical body portion 2 are coacting segmental cutting-blades 5, the upper edges of which are adapted to be brought together to sever the stems of the fruit being picked. To one side of the blades 5 and preferably formed integral therewith are oppositely-projecting right-angularly-formed operating-levers 6, to the outer ends of which are connected the upper end of a pair of links 7. The lower ends of the links 7 are pivotally connected together and to the upper end of an operating-rod 8, said levers and links forming a lazy-tongs construction by means of which the blades are opened and closed. The rod 8 passes through a guide-sleeve 9 on the cylindrical body of the picker and through guide-eyes 10 on the handle and extends down said handle to within convenient reach of the operator, at which point the rod has formed thereon a loop or eye 12, by means of which the same is conveniently grasped.

The lower end of the cylindrical body 2 is provided with a threaded annular flange 13, on which is adapted to be screwed a cap 14, which is removed to permit of the discharge of fruit from the cylinder. Arranged within the cylinder is a weak coiled spring 15, to the upper end of which is secured a bag 16, formed of soft fabric material and having in its lower end an opening or passage 17, around the edge of which is secured an elastic ring 18. By providing the spring 15 and bag 16 the fall of the severed fruit will be broken, so that the same will pass into the cylinder in an unbruised or unbroken condition, the fruit passing or being forced through the elastic ring and through the spring in the cylinder, from whence it may be removed by unscrewing the cap 14 on the opposite end thereof.

In Fig. 5 of the drawings is shown a slightly-modified arrangement of the picker, the latter being shown in this instance as having the cap 14 removed and a series of radially-projecting lugs 19 formed on the side of the cylinder near its lower end. Upon said lower end and secured by said lugs is the upper end of a bag 20 to receive the fruit passing through the cylindrical body portion 2. The bag 20 is provided on its upper end with draw-strings 21, by means of which it may be securely fastened to the cylinder 2 and by which the bag may be closed when removed from said cylinder.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A fruit-picker comprising a tubular body portion, of a supporting rod or handle connected thereto, severing-blades pivotally mounted on the upper end thereof, means to operate said blades, a spring arranged within said cylinder, a bottomless bag secured to the upper end of said spring, and an elastic ring secured to the lower edge of said bag, substantially as described.

2. A fruit-picker comprising a tubular body portion, a removable cap secured to the lower end thereof, segmental severing-blades pivotally mounted on the upper ends of said cylinder, lazy-tongs connected to said blades and operating-rods connected to said lazy-tongs, a pole or handle secured to said cylinder, a coil-spring arranged within the latter, and means open at both ends secured to the upper end of said spring to break the fall of the fruit severed by said blades and drop it into said cylinder, substantially as described.

3. A fruit-picker comprising a cylindrical tubular body portion, a removable cap arranged on the lower end thereof, a bag or support detachably connected to the lower end of said cylinder, a pair of segmental cutting-blades pivotally mounted on the upper end of the same, lazy-tongs connected to said severing-blades, a supporting-handle secured to said cylinder, an operating-rod slidably mounted on the latter and passing through guides on said handle to within convenient reach of the operator, a spring arranged within said cylinder, a bottomless bag secured to the upper end of said spring, and an elastic ring secured to the lower open end of said bag, substantially as described.

In testimony whereof I have hereunto set my hand in presence of two subscribing witnesses.

PHILIP KOERPER.

Witnesses:
 FON ROGERS,
 J. H. YOUNG.